(12) United States Patent
Krumme

(10) Patent No.: US 6,843,561 B2
(45) Date of Patent: Jan. 18, 2005

(54) EYEGLASS LENS AND FRAME ASSEMBLY

(75) Inventor: John Krumme, Tahoe City, CA (US)

(73) Assignee: Beta Group, Inc., Menlo Park, CA (US)

( * ) Notice: Subject to any disclaimer, the term of this patent is extended or adjusted under 35 U.S.C. 154(b) by 0 days.

(21) Appl. No.: 10/425,022

(22) Filed: Apr. 28, 2003

(65) Prior Publication Data

US 2003/0227595 A1 Dec. 11, 2003

Related U.S. Application Data

(63) Continuation-in-part of application No. 10/374,684, filed on Feb. 25, 2003, now abandoned, which is a continuation-in-part of application No. 10/138,053, filed on May 3, 2002, now Pat. No. 6,523,952.

(51) Int. Cl.⁷ .................................................. G02C 1/02
(52) U.S. Cl. ........................... 351/110; 351/86; 351/106
(58) Field of Search ................................ 351/110, 124, 351/83, 86, 103, 106, 140, 41

(56) References Cited

U.S. PATENT DOCUMENTS

| 4,896,955 A | 1/1990 | Zider et al. |
| 6,164,775 A | 12/2000 | Zider et al. |
| 6,523,952 B1 | 2/2003 | Krumme |
| 6,641,265 B1 * | 11/2003 | Hou ............................ 351/110 |

FOREIGN PATENT DOCUMENTS

| EP | 1083456 | 3/2001 |
| FR | 2766586 | 7/1997 |

* cited by examiner

*Primary Examiner*—Hung Xuan Dang
(74) *Attorney, Agent, or Firm*—Madson & Metcalf

(57) ABSTRACT

An eyeglass assembly comprises a lens and a frame member. One of the lens and the frame member has a recess formed in it which has a generally constant cross-section when viewed from one end along at least part of its length. The recess is defined by a pair of opposed arms with reentrant portions at their ends which define a longitudinal opening between them extending along at least part of the length of the recess, and it has an opening at one end. The other of the lens and the frame member bears a head portion. The recess and the head portion are configured so that the head portion can be fitted into the recess by sliding it through the opening at the said end of the recess, and so that the head portion is prevented by the reentrant portions of the arms from being withdrawn from the recess through the longitudinal opening.

10 Claims, 4 Drawing Sheets

EYEGLASS LENS AND FRAME ASSEMBLY

CROSS-REFERENCE TO RELATED APPLICATION

This is a continuation-in-part of application Ser. No. 10/374,684, filed Feb. 25, 2003, now abandoned, which is a continuation-in-part of application Ser. No. 10/138,053, filed May 3, 2002, U.S. Pat. No. 6,523,952.

BACKGROUND OF THE INVENTION

This invention relates to an eyeglass assembly which comprises a lens and a frame member, and to a method of assembling an eyeglass.

An eyeglass will comprise frame components and lens components. It will generally include two lenses (although it might include just one). An eyeglass which includes two lenses will generally include, as frame components, a nose bridge by which the two lenses are connected to one another, and temples which extend from the lenses to fit against the user's ears. The present invention is concerned with fastening frame components and lens components together.

It is known from U.S. Pat. No. 6,164,775 to fasten frame components to the lens of an eyeglass using lugs which are formed on the edge of the lens. The frame components are formed with a gripping portion which includes a pair of gripping arms. The configuration of the gripping portion can change between an open configuration in which the arms are spaced apart, and a closed configuration in which the arms grip the lug. The gripping portion can be formed from a shape memory alloy. Articles formed from shape memory alloys can exhibit shape memory properties associated with transformations between martensite and austenite phases of the alloys. These properties include thermally induced changes in configuration in which an article is first deformed from a heat-stable configuration to a heat-unstable configuration while the alloy is in its martensite phase. Subsequent exposure to increased temperature results in a change in configuration from the heat-unstable configuration towards the original heat-stable configuration as the alloy reverts from its martensite phase to its austenite phase. The transformation from austenite to martensite on cooling begins at a temperature known as the $M_s$ temperature, and is completed at a temperature known as the $M_f$ temperature. The transformation of martensite to austenite upon heating begins at a temperature known as the $A_s$ temperature and is complete at or above a temperature known as the $A_f$ temperature. Shape memory alloys are discussed in an article by L McDonald Schetky in the Encyclopedia of Chemical Technology (edited by Kirk-Othmer), volume 20 pages 726 to 736.

BRIEF SUMMARY OF THE INVENTION

The present invention provides an eyeglass assembly in which a frame component is attached to a lens by means of a recess and head portion which fits in the recess, in which the recess has a generally constant cross-section when viewed from one end along at least part of its length, defined by a pair of opposed arms with reentrant portions at their ends which define a longitudinal opening between them extending along at least part of the length of the recess.

Accordingly, in one aspect, the invention provides an eyeglass assembly which comprises a lens and a frame member, in which (a) one of the lens and the frame member has a recess formed in it which has a generally constant cross-section when viewed from one end along at least part of its length, defined by a pair of opposed arms with reentrant portions at their ends which define a longitudinal opening between them extending along at least part of the length of the recess, and which has an opening at one end, and (b) the other of the lens and the frame member bears a head portion, and in which the recess and the head portion are configured so that the head portion can be fitted into the recess by sliding it through the opening at the said end of the recess, and so that the head portion is prevented by the reentrant portions of the arms from being withdrawn from the recess through the longitudinal opening.

In another aspect, the invention provides a method of assembling an eyeglass which comprises a frame member and a lens in which (i) one of the lens and the frame member has a recess formed in it which has a generally constant cross-section when viewed from one end along at least part of its length, defined by a pair of opposed arms with reentrant portions at their ends which define a longitudinal opening between them extending along at least part of the length of the recess, and which has an opening at one end, and (ii) the other of the lens and the frame member bears a head portion, in which the method comprises the steps of:

a. sliding the head portion into the recess through the said opening at the end of the recess, and b. closing the opening at the end of the recess to prevent inadvertent removal of the head portion from the recess.

The present invention provides a technique for assembling an eyeglass in which the assembly can be secure against inadvertent disassembly. The frame can be assembled quickly and conveniently. By accurate manufacture of the eyeglass components, the configuration of the assembled product can be carefully controlled.

The end of the recess through which the head portion is inserted into the recess can be closed by means of a connector band which can be fitted around the head portion and the arms which define the recess, to prevent the head portion from being withdrawn from the recess through the opening at the end of the recess. The connector band can be in the form of a closed loop with a continuous cross-section. The band can have an open cross-section, for example it can be generally C-shaped. The band can be formed from an elastic material which can be fitted around the arms and the head portion after they have been assembled. The connector band can be closed mechanically around the arms and the head portion.

The present invention provides a technique for assembling an eyeglass frame which can be secure. The formation of a connection using a band has the advantage of providing a generally uniform distribution of stress across the cross-section of the connection. The stress in the connector band primarily involves the band being in tension. The stress distribution is more uniform than can be obtained with a connector which makes use of a pair of gripping arms which bend relative to one another between open and closed configurations; in this form of connector, the stress in the connector arises primarily from bending of the arms. The strength of the connection between the frame and lens of the eyeglass is dependent on the stress that is imposed by the connector on the lens lug. The connector band that is used in the present invention facilitates the imposition of higher stresses on the lens lug compared with the stresses which can be imposed using a connector comprising a pair of gripping arms. The use of a connector band, especially with which has a continuous cross-section, therefore facilitates the formation of secure connections between the lens and a frame component of an eyeglass using connectors of small size.

Preferably, the connector band is formed from a shape memory alloy, especially an alloy which has been treated so that the band shrinks inwardly when its temperature is increased to a temperature at which the alloy transforms from martensite phase to austenite phase.

Shape memory alloys which can be used in the invention include Ni—Ti based shape memory alloys. Such alloys include binary alloys, such as those in which the nickel content is at least about 50 at. %, preferably at least about 50.5 at. %. The nickel content will usefully be less than about 52 at. %, preferably less than about 51 at. %. Other Ni—Ti based alloys can be used, including alloys with ternary and quaternary and possibly other additions. Examples of elements that can be incorporated in the alloy include one or more of Cr, Fe, Co, Al, Cu, Nb and Zr. Added elements can be present in amounts up to about 10 at. %, preferably up to about 5 at. %. Alloys which are suitable for this treatment are preferably thermally unstable, meaning that their properties can be altered through thermal ageing after quenching from above the solvus temperature. It is understood that certain alloying additions may cause the specific temperatures cited to change somewhat, and that appropriate corrections be made. Shape memory alloys which other than those based on nickel and titanium can also be used.

Techniques for treating a component so that it exhibits a shape memory effect are well established. They can include combinations of heat treatments and working the alloy. Preferably, the component is treated so that the $A_f$ temperature of the alloy is not more than about 75° C., more preferably not more than about 50° C. Preferably, the $M_s$ temperature of the alloy is not more than about −15° C., more preferably not more than about −25° C. The use of an alloy with an $M_s$ temperature which is below one or both of these limits has the advantage of allowing use of the assembly of the invention in cold temperatures without the connection between the lens and the frame becoming loose. By appropriate selection of the transformation temperatures of the alloy which is used in the assembly of the invention, it can be used in temperatures as low as −15° C., preferably as low as −20° C. It can be used in temperatures as high as 30° C., preferably as high as 40° C.

An example of a technique that can be used to form a connector band from a nickel-titanium based alloy involves forming the band from a tube, which generally will have a circular cross-section. The tube is mechanically formed using a die at a temperature in the range 500 to 550° C. The tube is then cooled to room temperature. The internal size and shape of the tube as mechanically formed corresponds approximately to the internal size and shape that is desired of the band when it has been shrunk. It should be smaller than the size of the arms so that there is some unresolved recovery after the connector band has been shrunk on to the arms. The band is subjected to a heat treatment by heating it to 525° C. for 10 seconds followed by quenching in cold water. The band can then be finished by a polishing technique such as tumbling, and can then be coated, for example by painting or plating.

The connector band can be expanded at low temperature, preferably at or below −40° C., and then mechanically stretched while at that low temperature. It can be deformed to about 6% strain. The deformed configuration is retained until the band is exposed to a temperature above the $A_f$ temperature of the alloy.

A shape memory alloy connector band will generally be expanded mechanically. The mechanical expansion can be performed using a mandrel. Other expansion techniques which can be used, in combination or independently include use of an expander tool which the band can be fitted on to, which includes a plurality of arms which can be forced apart. For example, two arms can be mounted for relative pivotal movement around a fulcrum, the arms having handle portions on one side of the fulcrum and expander portions on the opposite side of the fulcrum. Squeezing the handle portions together causes the expander portions to diverge. This tool can provide control over the degree of expansion since expansion is limited by contact of the handle portions. It can also provide a mechanical advantage to facilitate expansion.

The appearance of a shape memory alloy band can be selected by treatments such as polishing, coating, plating, oxidation treatments, and the like.

Preferably, the recess is provided on the lens and the head portion is provided on the frame member. However, the alternative arrangement in which the recess is provided on the frame member and the head portion is provided on the lens is also envisaged.

Preferably, a transverse dimension of at least one of the arms which define the recess is increased at or towards its free end compared with that dimension along substantially the remainder of its length. This has the advantage of increasing the security of the connection between the recess and the head portion by reducing the risk of a band being displaced from around the arms. When the recess is provided in a lug, for example on the lens, the increase in the transverse dimension is preferably at least about 2%, measured relative to the said dimension at the root of the lug, more preferably at least about 5%. Preferably, the increase in the transverse dimension is not more than about 15%, more preferably not more than about 10%. For example, one or both of the arms can include a lip at its free end, extending around at least a part of the periphery of the or each arm. For example, the lip can be provided in two or more spaced apart regions towards the edge of the arm. Preferably, the lip extends around the entire periphery of the arm. The arm can be flared outwardly towards its free end, at least over a part of its cross-section.

In the assembly of the invention, the frame member can be a nose bridge which can extend between a pair of lenses, over the user's nose when the assembly is in use. The frame member can comprise a temple portion. For example, the frame member can be an entire temple, including a part which is intended to extend past the user's ear. It will then generally include a hinge or will be made from a material which is sufficiently flexible for it to be capable of flexing, for example to enable it to fit a user's head accurately or to enable it to be folded for storage. The frame member might comprise just a part of a temple, for example the part which extends from the lens to a hinge or other connector at which the temple arm is connected. For example, a frame member might include the respective part of the recess and head portion combination, and be connected to another part of a frame (such as the part of a temple which extends past the user's ear) by means of a spigot and socket arrangement. For example, the frame member can define a socket for an elongate member such as a length of rod or wire which is to provide the temple or the nose bridge. The elongate member can be fastened in the socket mechanically or by bonding (including techniques such as soldering). The reverse arrangement can be used in which the elongate member has a socket formed in it, in which the end of the frame member can be received.

The lens can have just one recess or head portion. The lens can be provided with two or more recesses, or two or more head portions, or a combination thereof. Preferably, the lens has two lugs, each defining a recess or providing a head portion. When a lens has two lugs, they can be positioned on opposite sides, for example to form connections to a nose bridge and to a temple respectively, when the lens is used in a pair of spectacles. When the lens has just one lug, the lug can be positioned for connection to a frame member which itself performs the function of frame components such as temples, nose bridges and nose pads, or is connected to frame components which perform these functions. For example, a lens might be provided with a single lug on its top edge by which it can be connected to a top frame part, which is connected to temples at its ends, and has nose pads depending from it. A lens might have a single lug on its top edge, and a single lug on its inward facing edge for connection to a nose pad.

A lug which defines a recess or provides a head portion can be formed as an integral part of the lens, for example by moulding or machining or a combination of processing steps. The lug can be formed separately from the lens and then bonded to it, for example by welding or by use of a separate bonding material such as an adhesive. The lug can be provided so that it extends beyond a line which extends across the lug between the edge of the lens on opposite sides of the lug. The lug can be defined relative to the body of the lens by recesses at its opposite edges in which the connector can be received. The lug can then be positioned so that it is wholly behind a line extending across the lug between the edge of the lens on opposite sides of the lug, or extends beyond that line.

Preferably the edges of the arms which are contacted by the inwardly facing surfaces of a band are rounded. When the recess is provided on the lens, the arms will generally be elongate when viewed in cross-section so that they have two generally parallel edges which extend approximately parallel to the faces of the lens, and two ends which extend between the parallel edges of the arms. Preferably, those ends of the arms are rounded.

Preferably, the length of the arms (the distance over which a band can be fitted) is at least about 0.75 mm, more preferably at least about 1 mm, for example at least about 1.25 mm. Preferably, the length of the recess (which will be measured in the same general direction as the thickness of the lens when the recess is on the lens), is at least about 1 mm, more preferably at least about 1.25 mm, for example at least about 1.5 mm. When the recess is provided on the lens, the length of the recess will generally be less than the thickness of the lens at the point at which the arms are connected to the lens body. Preferably, for most lenses, the length of the arms will approach that of the lens.

The lens can be formed from glass. Preferably, the lens will be formed from a polymer material such as is used in the eyeglass lenses, especially a polycarbonate. When the lug is formed separately from the lens, it can be formed from a material which is the same as the material of the lens or different from it.

BRIEF DESCRIPTION OF THE DRAWINGS

Embodiments of the present invention will now be described by way of example with reference to the accompanying drawings, in which.

DETAILED DESCRIPTION OF THE INVENTION

Figure 1:
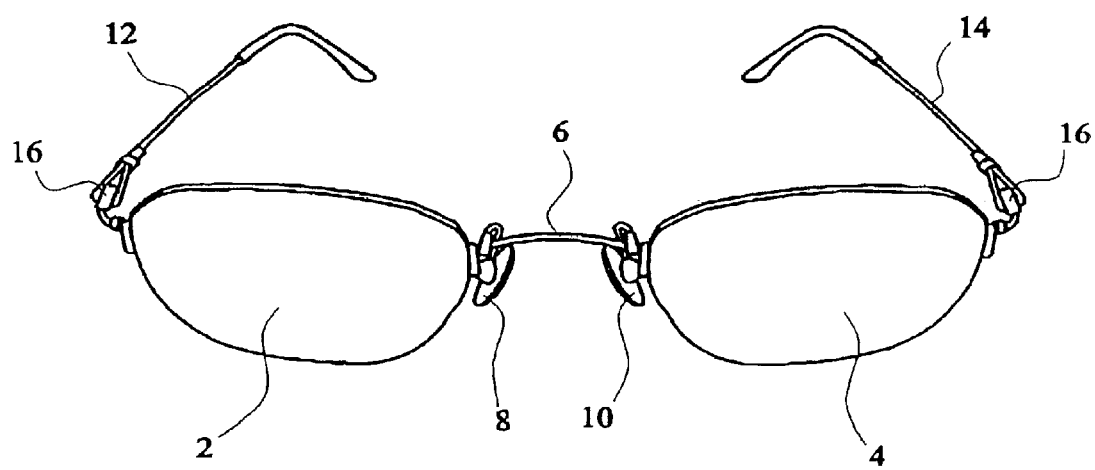
FIG. 1 is an isometric view of a pair of spectacles according to the present invention.

Referring to the drawings, FIG. 1 shows a pair of spectacles which comprises lenses 2, 4, a nose bridge 6 which carries a pair of nose pads 8, 10, and a pair of temples 12, 14. Each of the temples includes a hinge 16 which enables the temples to be folded for storage. The lenses are formed from a polycarbonate material. The connections between the lenses and the ends of the temples and the nose bridge are each made using a head member which fits into a recess, as described in more detail below. The arm parts of the temples (which extend to and over the user's ears) are formed from a material which has properties which are desired by the frame designer, for example in terms of colour, weight, flexibility and so on. The nose bridge can be formed from the same material as the arm parts of the temples or a different material.

Figure 2:
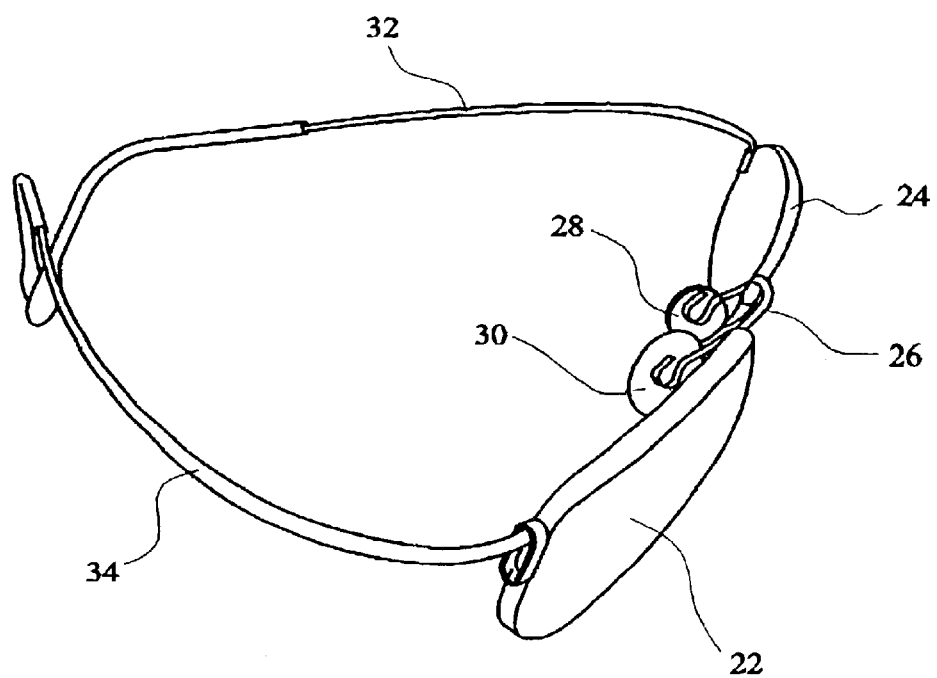
FIG. 2 is an isometric view of another pair of spectacles according to the invention.

The pair of spectacles shown in FIG. 2 comprises lenses 22, 24, a nose bridge 26 which carries a pair of nose pads 28, 30, and a pair of temples 32, 34. Each of the temples is formed from a material which has suitable flexibility to enable the temples to be folded without use of a hinge at or close to where they are connected to the lenses, such as a shape memory alloy which has been treated so that it exhibits enhanced elastic properties. The enhanced elastic properties of shape memory alloys are well known in general, and are discussed in "Engineering Aspects of Shape Memory Alloys", by T W Duerig et al, Butterworth-Heinemann (1990).

Figure 3A:
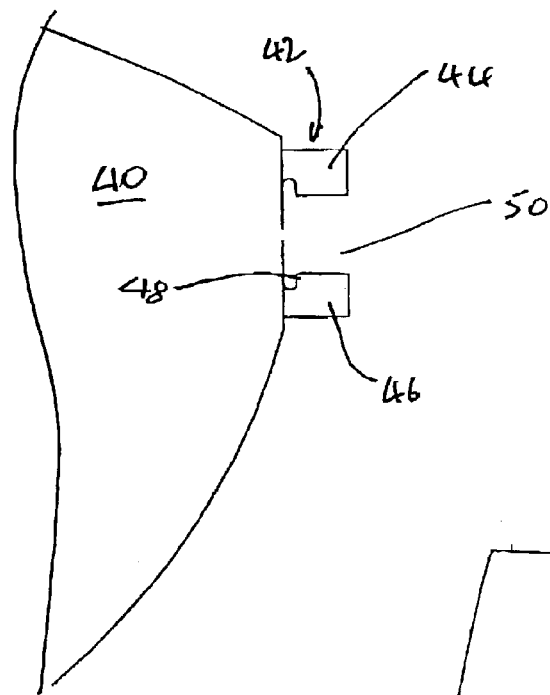
FIG. 3A is a front view of a part of a lens which has a lug two arms at one edge, provided by two arms which define a recess between them.
Figure 3B:
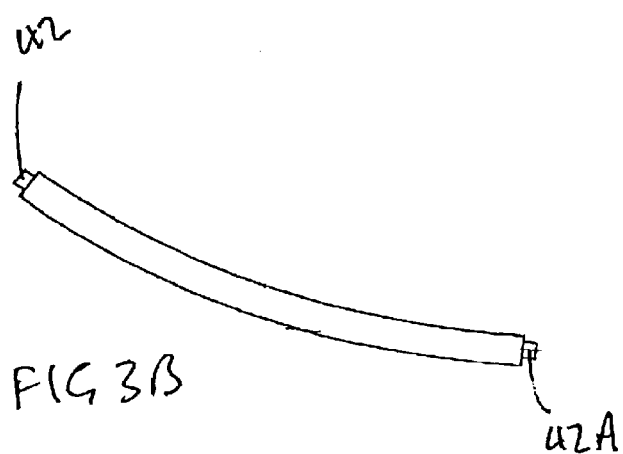
FIG. 3B is a plan view of the lens shown in FIG. 3A.
Figure 3C:
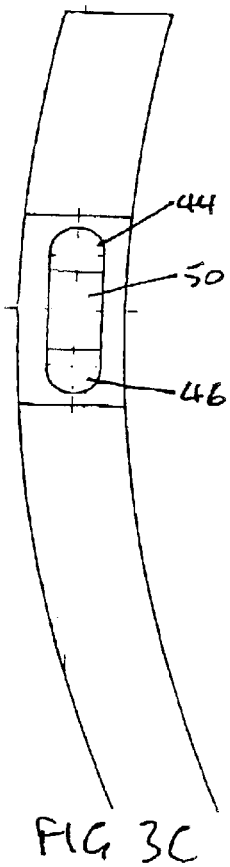
FIG. 3C is a view of the edge of the lens shown in FIG. 3A on which the lug is provided.

FIG. 3A to FIG. 3C show enlarged views of a spectacle lens such as might be used in the spectacles shown in FIGS. 1 and 2. The lens 40 is shown with a lug 42 which has a recess formed in it. The recess has a generally constant cross-section when viewed in the sense shown in FIG. 3A. The recess is generally C-shaped when viewed from one end (as shown in FIG. 3A). The recess is defined by a pair of opposed arms 44, 46, each of which has a reentrant portion 48 at their ends, which define a longitudinal opening 50 extending along the length of the recess.

A lug which defines a recess, as shown in FIGS. 3A and 3C, can be provided at one edge of a lens, to be engaged by either a temple or a nose bridge. As shown in FIG. 3B, more than one lug can be provided on a lens, for example at opposite edges to be engaged by a temple and a nose bridge respectively. The lens shown in FIG. 3B has lugs 42, 42A on opposite sides. The lens is shaped so that one side edge is directed outwardly, towards the outside of the user's face, and the other side edge is directed inwardly, towards the user's nose. The lug on the outside edge of the lens is intended for attachment of a temple; the lug on the inside edge of the lens is intended for attachment of the nose bridge.

Figure 4:
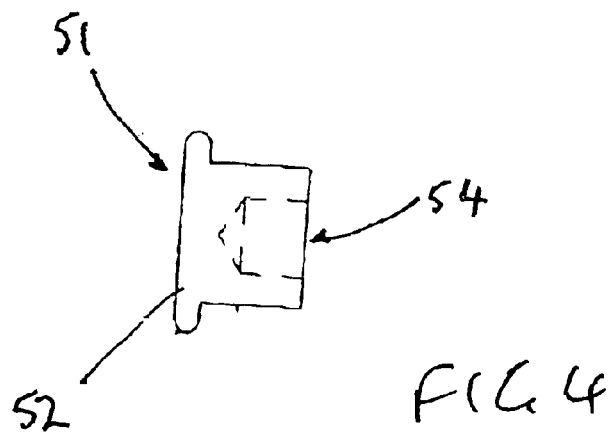
FIG. 4 is a side view of the end of a frame member fitting which is configured to fit the lug of the lens shown in FIG. 3.
Figure 5:
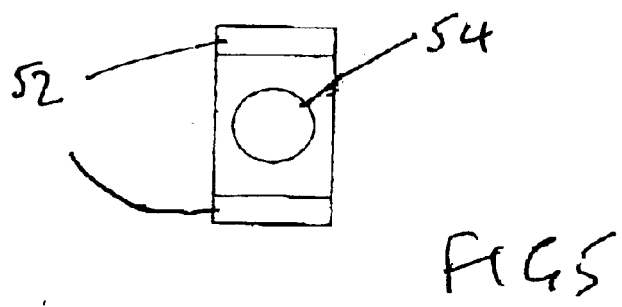
FIG. 5 is a view from one end of the frame member fitting shown in FIG. 4.

FIGS. 4 and 5 show the end of a frame member 51. It can be the end of a temple or the end of a nose bridge. The frame member can be a connector for a temple or a nose bridge, by which it is connected to the lens (as shown in FIG. 4). The frame member has a head portion 52 which is generally T-shaped when viewed from one side. Preferably, the arms of the T-shape are rounded at their corners to reduce concentrations of stress where the frame member engages the internal surfaces of the recess in the lug.

The frame member 51 has a socket 54 formed in it in which the end of a temple or a nose bridge can be received, and connected by a technique such a crimping or soldering or bonding by means of an adhesive.

The thickness of each of the lugs is the same as, or slightly less than the thickness of the lens at the root of the lug. For example, the thickness of the lug might be about 1.55 mm. The height of each lug will be selected to provide torsional stability for the connection between the frame member and the lens. For example, the height of the lug might be about 5.3 mm. The length of the lug (the distance by which it protrudes from the lens body, onto which the connector band can be fitted) might be about 1.27 mm. The positions of the lugs on the lens edges will be selected according to the frame design. For example, the lug for connecting the temples to the frame can be positioned on the top edge of the lens if desired. The lug can have an enlarged portion at its end which is remote from the end body, for example in the form of a partial rim or an outwardly flared portion.

Generally, the lugs will be manufactured with the lens body from a single block of lens material, for example using moulding, cutting and other conventional techniques. however, the lug can be manufactured separately from the lens body and fastened to it, for example by welding or by use of a separate bonding material such as an adhesive.

Figure 6:
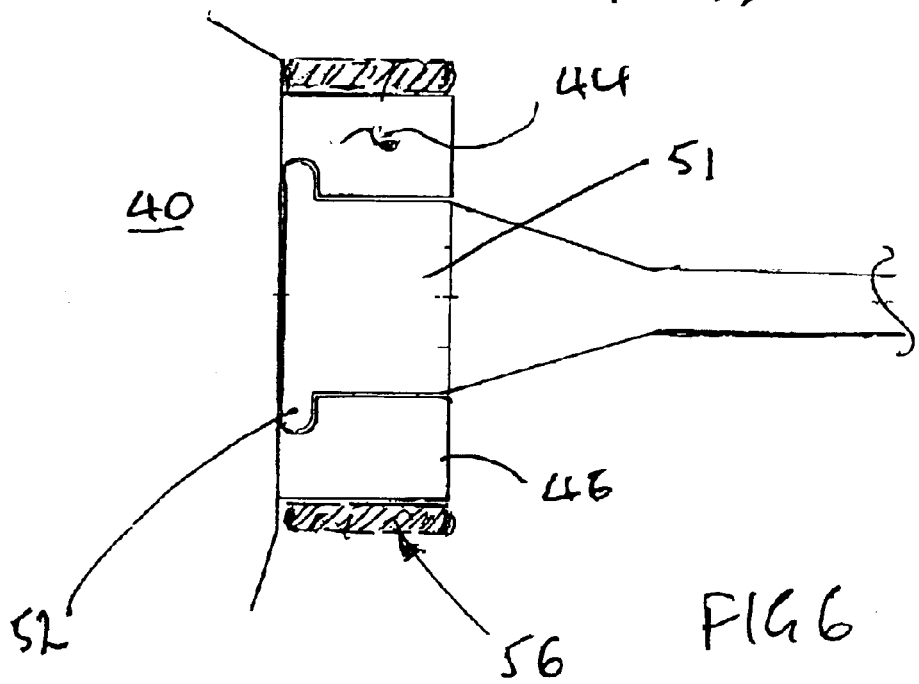
FIG. 6 is a side view, partially in section, showing a frame member which is fitted between the arms at the edge of a lens such as that shown in FIG. 3.

FIG. 6 shows the lens of FIG. 3 connected to a frame member. The frame member is generally as shown in of FIGS. 4 and 5 except that it is formed integrally with an elongate member such as the arm part of a temple. The head portion 52 of the frame member 51 is slid into the recess in the lug 42 from one end of the longitudinal opening so that the frame member extends through the opening.

The head portion of the frame member is retained within the recess in the lug 42 by means of a band 56 which is positioned around the lug and the end of the frame member. The band is formed from a shape memory alloy, for example by cutting a short section from an extruded tube. The band can be prepared so that it has an initial enlarged configuration which allows it to be slid over the lug. It can then transform to a smaller configuration by allowing its temperature to increase to above the $A_s$ temperature of the alloy, as is well known with shape memory alloys. The smaller configuration of the band should be selected so that the band fits securely on to the lug on the lens, and remains under tension due to unresolved recovery. The tension should not be so great that it damages the lug or the head portion of the frame member. Retention of the band around the lug can be enhanced by providing a lip at the outer edge of one or each of the arms which define the lug. The provision of a lip can allow the amount of unresolved recovery to be kept low, reducing stresses imposed by the band on the lug, while still ensuring adequate fixation of the frame member to the lens.

Figure 7:
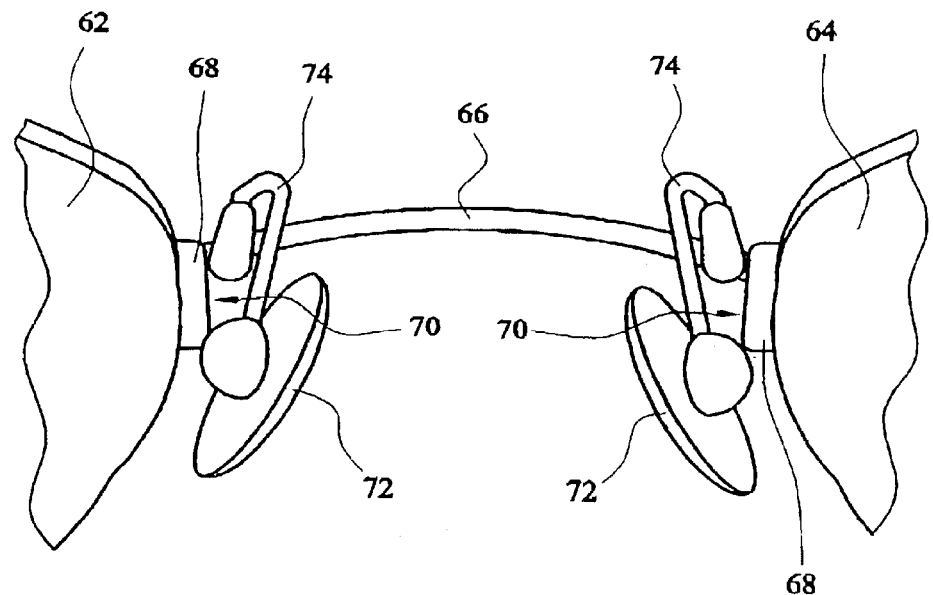
FIG. 7 is an enlarged view of the nose bridge of the pair of spectacles shown in FIG. 1.

FIG. 7 shows a pair of spectacles which comprises lenses 62, 64 which are connected by a nose bridge 66. The nose bridge is provided by a piece of wire which is connected at each end to the lenses by means of connector bands 68 which are positioned around lugs 70 on the lenses. The connection is achieved by the ends of the nose bridge being received with the lugs 70 within the connector bands 68. Nose pads 72 are connected to the nose bridge by means of nose pad wires 74 whose ends are fastened to the nose bridge by techniques such as soldering, welding, crimping etc.

The connector bands may be formed from a tube of the alloy. The tube may be mechanically formed using a die at a temperature in the range 500 to 550° C. The tube can be cut to form the individual connector bands prior to the mechanically forming step. The tube is then cooled to room temperature. The internal size and shape of the tube as mechanically formed corresponds approximately to the internal size and shape that is desired of the connector bands when they have been shrunk. It should be smaller than the size of the lugs so that there is some unresolved recovery after the bands have been shrunk onto the lugs. The connector is subjected to a heat treatment by heating it to 525° C. for 10 seconds followed by quenching in cold water. The connector is then finished by a polishing technique such as tumbling, and can then be coated, for example by painting or plating.

While the drawings show connections between a lens and a frame member in which a lug is provided on the lens, defining a recess in which a head portion on the frame member can be received, it will be understood that the lug and the head portion can be reversed so that the lug is on the frame member, and the head portion is on the lens. This latter construction can have advantages because of the greater potential for inwardly deforming the arms which define the recess in a lug on a frame member by means of the band, to grip the head portion on the lens.

Figure 8:
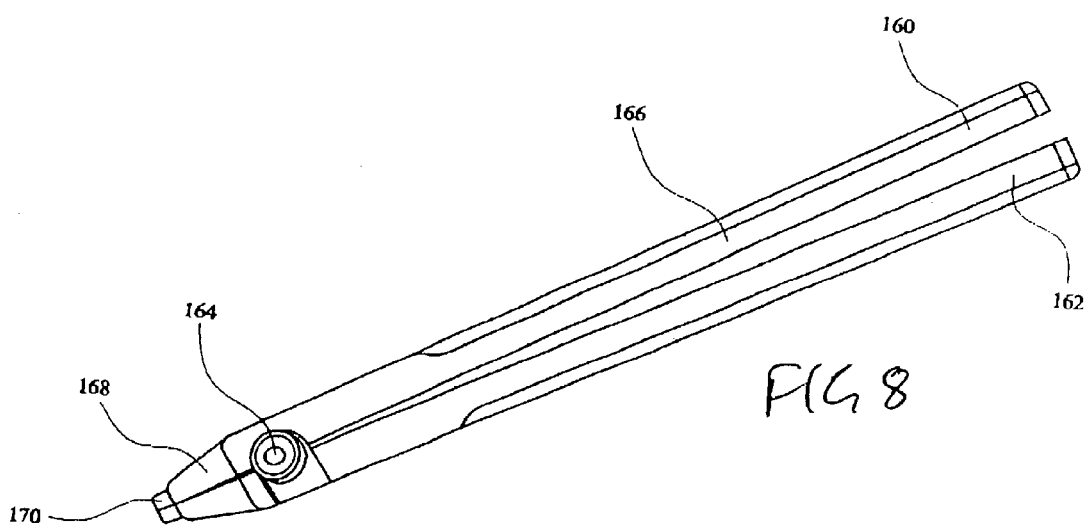
FIG. 8 is a view from above of a tool which can be used to expand a connector band.

FIG. 8 shows an instrument which can be used to expand a connector loop while the alloy is in its martensite phase, in the expansion stage of the manufacturing process. The instrument comprises first and second bars 160, 162 which are arranged to pivot around a fulcrum pin 164. The first bar 160 has a handle portion 166 and an expander portion 168 on the opposite side of the fulcrum pin. The second bar 162 has similar portions. Each of the expander portions has a profiled end 170 at its end on which a connector loop can be positioned for expansion. The instrument can be used by squeezing the handle portions of the bars together. As they are so squeezed, the expander portions are forced apart. Movement apart of the expander portions (and therefore the degree of expansion of the connector loop) is limited by the handle portions coming into contact with one another.

What is claimed is:

1. An eyeglass assembly which comprises a lens and a frame member, in which (a) the lens has a recess formed in it which has a generally constant cross-section when viewed from one end along at least part of its length, defined by a pair of opposed arms with reentrant portions at their ends which define a longitudinal opening between them extending along at least part of the length of the recess, and which has an opening at one end, and (b) the frame member bears a head portion, and in which the recess and the head portion are configured so that the head portion can be fitted into the recess by sliding it through the opening at the said end of the recess, and so that the head portion is prevented by the reentrant portions of the arms from being withdrawn from the recess through the longitudinal opening, wherein the eyeglass assembly includes a band which can be fitted around the head portion and the said opposed arms so as to close the opening at the end of the recess, and to prevent the head portion from being withdrawn from the recess.

2. An assembly as claimed in claim 1, in which the band is formed from a shape memory alloy.

3. An assembly as claimed in claim 2, which the shape memory alloy has been treated so that the band shrinks inwardly when its temperature is increased to a temperature at which the alloy transforms from martensite phase to austenite phase.

4. An assembly as claimed in claim 1, in which at least one of the said opposed arms has a lip on its external surface to prevent inadvertent removal of the band from around the arms.

5. An assembly as claimed in claim 1, in which the recess is provided on the lens and the head portion is provided on the frame member.

6. An assembly as claimed in claim 5, in which the recess is provided in a lug which is formed separately from the lens and bonded to it.

7. An assembly as claimed in claim 5, in which the frame member is generally T-shaped at the head portion thereof.

8. An assembly as claimed in claim 5, in which the recess is generally C-shaped when viewed in cross-section from one end thereof.

9. A method of assembling an eyeglass which comprises a frame member and a lens in which (i) the lens has recess formed in it which has a generally constant cross-section when viewed from one end along at least part of its length, defined by a pair of opposed arms with reentrant portions at their ends which define a longitudinal opening between them extending along at least part of the length of the recess, and which has an opening at one end, and (ii) the frame member bears a head portion, in which the method comprises the steps of:

a. sliding the head portion into the recess through the said opening a the end of the recess, and b. closing the opening at the end of the recess to prevent inadvertent removal of the head portion from the recess, in which the opening at the end of the recess is closed by means of a band, and in which the step of closing the opening involves positioning the band around (i) the head portion and (ii) the arms which define the recess.

10. A method as claimed in claim 9, in which the band is formed from a shape memory alloy, and in which the method includes the step of increasing the temperature of the band to a temperature at which the alloy transforms from martensite phase to austenite phase.

* * * * *